United States Patent [19]

Calotychos et al.

[11] Patent Number: 5,689,415
[45] Date of Patent: Nov. 18, 1997

[54] CONTROL OF PAINT SPRAYING MACHINES AND THE LIKE

[75] Inventors: Jean Andre Calotychos, London; Mark Miles, Witham; John Mather McBride, Emmer Green, all of England

[73] Assignee: Ducost Engineering Ltd., Kent, England

[21] Appl. No.: 343,454

[22] PCT Filed: Jun. 1, 1993

[86] PCT No.: PCT/GB93/01155

§ 371 Date: Dec. 9, 1994

§ 102(e) Date: Dec. 9, 1994

[87] PCT Pub. No.: WO93/24870

PCT Pub. Date: Dec. 9, 1993

[30] Foreign Application Priority Data

Jun. 1, 1992 [GB] United Kingdom .................. 9211539

[51] Int. Cl.$^6$ .................................................. G05B 11/32
[52] U.S. Cl. ............... 364/172; 364/469.02; 364/468.01; 364/468.23; 364/130
[58] Field of Search ...................................... 364/132, 130, 364/138, 468.01, 468.02, 468.21, 468.23, 469.02, 172

[56] References Cited

U.S. PATENT DOCUMENTS

| | | | |
|---|---|---|---|
| 4,459,655 | 7/1984 | Willemin | 364/132 |
| 4,564,913 | 1/1986 | Yomogida et al. | 364/474.11 |
| 4,602,343 | 7/1986 | Dougherty | 364/505 |
| 4,631,664 | 12/1986 | Bachman | 395/600 |
| 4,698,766 | 10/1987 | Entwistle et al. | 364/468.02 |
| 4,774,661 | 9/1988 | Kumpati | 395/600 |
| 4,825,376 | 4/1989 | Brinker et al. | 364/471.01 |
| 4,833,624 | 5/1989 | Kuwahara et al. | 395/84 |
| 4,855,906 | 8/1989 | Burke | 395/600 |
| 4,901,218 | 2/1990 | Cornwall | 364/131 |
| 5,083,591 | 1/1992 | Edwards et al. | 141/9 |
| 5,150,288 | 9/1992 | Imai et al. | 364/132 |

FOREIGN PATENT DOCUMENTS 22920589  7/1989  Australia.

OTHER PUBLICATIONS

Matsumoto, "Management of Industrial Software Production", Computer, Feb. 1984, pp. 59–71.

Korth et al; Database System Concepts, McGraw–Hill, pp. 143–168, 1986.

Primary Examiner—Reba I. Elmore
Assistant Examiner—Robert J. Dean
Attorney, Agent, or Firm—Watson Cole Stevens Davis P.L.L.C.

[57] ABSTRACT

Intelligent data storing apparatus for use in a control system comprising at least one programmable logic controller (PLC) for controlling one or more devices to perform a process, the process having a number of variants. The apparatus comprises means for receiving a data request including a code designating a process variant and a code indicative of one or more designated devices requiring control in order to implement the process variant; a database dictionary defining a tree structure relating operational data elements to particular variants of the process and particular devices; and means for retrieving operational data elements from the database using pathnames corresponding to the structure specified in the database dictionary and for formulating the retrieved data into a block having a predetermined structure for outputting to the PLC.

12 Claims, 9 Drawing Sheets

Bodies:

Body 1: Saloon car
Body 2: Estate car
Body 3: Van

Colours:

Colour 1: White
Colour 2: Yellow
Colour 3: Orange
Colour 4: Red
Colour 5: Brown
Colour 6: Green
Colour 7: Blue
Colour 8: Black Stations:

Station 1: Machine 1
Machine 2
Machine 3
Machine 4
Machine 5

Zones:

Zone 1: Machine 1 & 2
Zone 2: Machine 3 & 4
Zone 3: Machine 5

Machines:

Machine 1: Bell 101: Cycles (1,2,3,4,5)
Machine 2: Bell Bell 201: Cycles (1,2,3,4,5)
Machine 3: Bell Bell 102: Cycles (1,2,4,6)
Machine 4: Bell Bell 202: Cycles (1,2,4,6)
Machine 5: Roof Machine: Cycles (1,7,8)

*Fig.6b*

Variables:

Var 1: Main valve - Boolean
Var 2: Colour changer valve 1 - Boolean
Var 3: Colour changer valve 2 - Boolean
Var 4: Solvent valve on colour changer - Boolean
Var 5: Shaping air - Boolean
Var 6: Turbine air - Boolean
Var 7: Paint Return Valve - Boolean
Var 8: Bypass valve - Boolean
Var 9: Distance from machine origin - Regulator (16 bit)

CONTROL OF PAINT SPRAYING MACHINES AND THE LIKE

BACKGROUND OF THE INVENTION

The present invention relates to the field of machine control and, more particularly to the control of paint spraying machines and the like.

For the purposes of illustration the following description has been given in terms of paint application in the automotive industry. It is to be understood that the invention is of wider applicability as described further below.

FIG. 1 gives an overview of a typical example of the paint application section ("booth") of a vehicle production plant, in diagrammatic form. The booth usually includes a number of "stations" each containing a set of machines. For example, station A shown in FIG. 1 contains eleven painting machines. Each station may be considered to be made up of a number of "zones". For example, in station A the pair of painting machines 101 and 201 which face one another across the conveyor may be treated as defining a zone, Z1. Similarly, the paint guns 301, 302 and 303, provided on a roof machine, may be treated as defining a zone, Z5. According to the present invention any combination of bells, stonechip, sill spray and manual hand colour stations can be used in each zone, it is freely configurable. A vehicle body 1 (here a car) to be painted is moved through the various zones and stations by a conveyor 3 (typically a pair of moving tracks in the floor).

Modern vehicle production plants cater for the manufacture of a number of different vehicle body styles painted in a range of colours. Successive vehicle bodies passing through a booth may be of different body styles and may require painting in different colours. In order that the relevant vehicle body style and colour can be determined it is usual for each body to have an ident code etched on it. As a vehicle body enters the booth its ident code is read by an optical system OP1. The ident code information is fed from the optical system OP1 to one or more programmable logic controllers (PLCs) controlling the paint application process in the booth. The PLC sets up the painting machines and ancillary equipment ready to begin painting the vehicle body when it enters the first station. Meanwhile the body is conveyed between a pair of substantially upright duster rollers DR1 for removing dust and particles from the surface of the body by physically brushing them away and applying a voltage. The duster DR1 may also serve to deionise the vehicle body, or a separate deioniser may be provided.

As is well known, such PLCs are "off the peg" devices generally designed to be able to control a wide range of machines (motors, valves, etc.) in response to given inputs and to be programmable in relatively simple ladder logic. A standard PLC requires programming so as to be able to control the particular installation in question.

Paint application machines and PLCs are made by a number of different manufacturers. An example of a PLC that is sometimes used in controlling paint application machines is the Simatic S5 model 101U from the Simatic S5 series manufactured by Siemens.

When used for controlling paint application machines in the automotive industry, the PLCs must be programmed with information on the number and types of paint guns and auxiliary devices which are to be controlled. The appropriate input/output blocks must be attached to the PLCs so that they will communicate with each peripheral device in the format appropriate to that device. The PLCs must also be programmed with control data so that each machine in the booth (paint gun, bell, duster, fan, etc.) will be appropriately controlled at all times when different models of car are being painted in different colours. Any given car model may be considered to consist of a number of vertical slices, with different characteristics being required of each paint gun when applying paint to each "slice" of the car ("profiling").

The behaviour of any machine in the booth can be described by specifying values for a set of parameters related to physical components of the machine. FIG. 2 helps to illustrate this concept.

In FIG. 2 an electrostatic paint spray gun is shown in diagrammatic form together with the associated valves, pumps, turbines, positioning equipment, etc. The illustrated device is referred to as a "bell" because there is a disc head attached to the spray gun which rotates at high speed, typically 25,000 r.p.m. In this example the behaviour or status of the bell can be defined by specifying the on/off condition of the valves V1, PL1, F1 to F8, V3, BY, LL, ML, HN, RF, FD1, FD2 and KS; the on/off condition of pumps PM and turbine TR; and the location of a reference point on the bell relative to the centre line of the station either in polar or Cartesian coordinates.

Thus, in order to control the bell illustrated in FIG. 2 it is necessary to supply control signals to various valves, switches and regulators (of dials) and to update the values of those control signals so as to alter machine operation as a vehicle body is moved past the bell. Traditionally this is done using a PLC.

The PLC receives inputs from monitoring devices which report the status of the various valves, switches etc. of the bell, an input from the ident code reader OP1, an input from an encoder monitoring the movement of the conveyor, inputs from photocells at various points along the production line and inputs from various safety devices. The PLC is informed of the vehicle body position when it passes each of the photocells. Between photocell locations the PLC estimates the vehicle body position based upon the expected speed of the conveyor and the signal indicating whether or not the conveyor is in motion.

The PLC has available to it data defining the changing patterns of values for the parameters of the bell for each vehicle body style and each colour. The overall set of fixed and changing parameter values for a given paint machine in relation to a particular vehicle body style and colour is termed a "recipe". The PLC identifies the appropriate recipe by reference to the ident read by optical system OP1. As the vehicle body moves past the bell the PLC conditions its outputs so as to set appropriate values for the bell's parameters (e.g. valve settings, bell location, etc.).

There are a number of problems associated with the conventional PLC methods used for controlling paint application.

FIG. 3 illustrates in diagrammatic form the internal structure of a PLC. When a bare PLC is obtained from the manufacturer the operating system will already be installed, e.g. the basic functioning of the CPU in obtaining and executing instructions will already be set and the CPU will be programmed to understand certain command words and syntax in instructions. The PLC is then tailored to a particular paint application process by attachment of relevant input/output devices and by inputting programs to define the sequence in which outputs will be switched dependent upon particular inputs, counter outputs, timer outputs, etc. These process-dependent programs make use of the recipe data. Further program steps will also be included relating to safety procedures and communication with any attached peripheral devices.

Traditionally, all of the recipe data which the PLC may need to use during the paint application process is stored in the PLC memory. This recipe data is stored in the form of lists of parameter values. If there are 8 possible vehicle body styles and 10 possible colours then 80 lists of recipe data are stored. Programs access recipe lists using an instruction which refers to the memory address or offset where the relevant list of control values begins. Each item in the list of values is then accessed sequentially.

Paint application techniques can stretch the processing power of the PLC, the software code is complicated and unique in design. The PLC can have restrictions in storing data "recipes" when the body style and colour configurations are large. In general PLCs come with relatively small memories and it is expensive to obtain a device with a large capacity of memory. Also, the simplest process-dependent programs make it necessary for the PLC to scan through all of the recipes during each cycle of program execution, regardless of which recipe is actually being used. This leads to a slowing in the scan rate of PLC execution and can mean that the scan rate does not keep up with the desired speed of the production line.

This factor restricts the number of machines that can be controlled by a single PLC. Conventionally a different PLC is used to control the paint application machines in each station. This can drastically increase the costs of the overall system.

When complicated configurations of paint machine/body style and colour arise the number of steps to be performed by the PLC becomes very large. In order to maintain a PLC scan rate that will allow a fast line speed complicated software execution techniques are required. In order to work with this complicated software extensive training of on-site maintenance personnel is required and it may be necessary to frequently call the software author on-site. Similar extensive training would be needed by a maintenance engineer if he is called upon to maintain a paint application control system using a different PLC or different types of paint application machine.

In these conventional systems it was difficult to alter parameters of the paint application process. In general a keypad was connected to the PLC to enable some user interaction with it during operation. When it was desired to change a piece of operational data to be used by the PLC the keypad was used to instruct the PLC to read the value for that parameter from its set position in memory into a predetermined output location in PLC memory. The quantity would then be read and displayed on a screen. The user would use the keypad to set a new value for the quantity and transfer the new value into a predetermined input location in PLC memory. The PLC would then transfer the new quantity from the input location into the memory location reserved for that parameter value. This process required several scans of the PLC program before completion of an edit and thus was quite slow.

In the basic systems described above for controlling a paint application process, one or more programmable logic controllers (PLCs) were used in association with a graphics package and visual display unit (VDU) on which to display images relating to conditions prevailing in the system. The graphics package could be produced by the same manufacturer as the PLC so as to interface properly or by a third party in which case special steps were usually required in order to ensure proper interfacing.

The graphics packages were often used to generate a display representative of the progress of the paint application process. Such graphics packages were used in the vicinity of the PLC or at a remote location using a Scada (Secondary control and data acquisition) system.

Historically, graphic packages, PLC based or Scada based, where the user adds his own 'value' i.e. pictures depicting the layout of the stations, etc., are not specifically designed for use in the paint application process and are seldom adapted to fulfil the user's exact needs. The 'keyboard' or 'keypad' suffers from the same problem. Often it is difficult to tailor such general products for use in monitoring the paint application process.

Also, in the known systems back-up of data used on production vehicles is not always house-kept correctly and good production data is often substituted by an old and redundant production data disc.

In a recent development, personal computers have begun to be used in the control system. First of all the PC was used to store the operational data needed by the PLC during control of the paint application process. This reduced the size of memory that the PLC was required to have thus easing problems associated with PLC scan rate and increasing the number of machines that can be controlled by a single PLC. In such systems, when operational data was required the PLC would make an appropriate request to the PC and the PC would download the relevant data into appropriate locations in PLC memory. A separate graphics package was usually provided. More recently the same PC has been used to store the operational data and to run a graphics package.

In the known systems where a PC is used to store operational data, the database is customised to the particular PLC being used in the system. Thus the format in which data is stored is appropriate to the syntax/operating system of the PLC and the working data for a given recipe is arranged sequentially in memory. In that way the PC can simply read out the data in a given range of addresses in response to receipt of a PLC request for working data.

In these systems, should the user decide to change the type of PLC that is being used then the whole database may require rewriting so that the data is in an appropriate format/syntax. Also, if a single element of data within a recipe is edited then this can result in an increase in the length of the recipe. Recipe data stored at subsequent memory locations will need to be shifted to later addresses in order to accommodate the edit. Besides being time-consuming in its own right, such a shifting of addresses causes additional problems if the database has associated software which accesses selected items of recipe data. Such software would require revision so as to take into account the renumbering of database addresses.

These problems arise because the software code required for configuring PLCs for use in controlling paint application machines varies dependent upon the particular models of PLC that have been selected and the particular models of paint application machine that are to be controlled. Software written for a PLC used in one paint application system is often not re-useable in other similar systems, e.g. 60–100% new software must be written when configuring the same PLC to control different paint application machines or when configuring a different PLC to control the same or different paint application machines. Furthermore, tailoring the database to the required PLC data format leads to a sequential arrangement of stored recipe data which has now been realised to be unnecessary and disadvantageous.

SUMMARY OF THE INVENTION

The present invention addresses these problems by using selected hardware and software techniques to take over aspects of the control process from the PLC. The disadvantages of the prior art systems can be reduced and in some cases removed completely.

The present invention stems from a realisation that the database need not be customised to the particular PLC being used and, more especially, successive data elements within a recipe do not need to be stored sequentially. According to the present invention the recipe data is stored in a database having a file-based structure. A requested data recipe is produced by accessing selected files and grouping the accessed data into a semi-standard format for delivery to the PLC.

The file-based structure of the database according to the present invention reflects a generalised model that has been developed of the paint application process. This generalised model is based on a division of the painting process for each machine into one or more cycles.

The structure of a particular cycle is defined at a sufficient level of generality such that the same definition will apply regardless of the vehicle body style being painted, the colour and the machine using that cycle. However, the data for the cycle can vary for each machine, body style and colour. This data is held in data-files and, in general, is accessed by a pathname identifying the machine index, body style index, colour index and cycle concerned.

An important factor is that recipe data should be transmitted to the PLC in an expected format. According to the invention the recipe data is transferred to the PLC in a cycle-based format. The cycle-based model of the paint application process is sufficiently general that such a format is compatible with PLCs of different manufacture/having different operating systems.

Preferred embodiments of the invention provide an operator interface which comprises the database, a graphical interface and an operator input device. The graphical interface includes a number of different pages. These pages are configurable by the user but are based on a number of predetermined page types. Thus, for example, there may be a page type for an editing page, for a system alarm, etc. Each page type has a specific functionality. Thus, although different instances of a given page type may have a different layout and display different variables the PC will respond to user inputs in a manner defined for that page type. For example, where the user input device is a keypad then for each page type specific functions can be assigned to the various keys. Also, predefined functions will be carried out when an instance of a particular page type is activated or deactivated.

The page types are defined in compiled C++ code and may be considered to be software objects. Instances of each page type are created using an EDIT utility and the definition of each page instance is stored in a data file.

The present invention has a number of advantages. Firstly, because the database deals in files and registers accommodating process changes such as water base and 2K materials would not be a major change to the system. More generally, if a configured system is altered either by changing various of the operational parameters (e.g. introducing a new colour) or by changing the PLC then in order to accommodate the change it is only necessary to make some changes in the data retrieval and formatting routine rather than to rewrite the whole database. Secondly, the invention provides a standardised user interface which is simple to set-up for use with different PLCs; the amount of programming required is considerably less than in known systems.

The present invention provides an intelligent interface for use in controlling a paint application process, or the like, in association with a PLC. In paint application embodiments of the invention, much of the control data specific to the use of the system in the application of paint is prepared in the interface itself leaving the PLC to control machine movement, safety and the like. Thus the present invention provides a generic control element for use in paint application systems and the like, enabling the system control to be "standardised" to a great extent.

Continual spray-machine technology changes affect the detailed control data that would be needed to handle machine axis movement, I/O interface and safety circuits controlled by the PLC. Thus the PLC programming needed for these functions may require change each time the spray-machines are updated. Accordingly it has been decided to leave control of these functions with the PLC rather than moving them to the interface provided by the present invention.

Although, as explained above, it may be impossible to keep up with machine control changes when creating a standard package, it is estimated that the PLC programming specific to machine control constitutes only 30% of the software required. Thus, by removing to the "standard" interface the generation of control data relating to the parameters used (paint pressure, volume, shaping air, turbine speed and high tension), which may be expected to remain unchanged, the amount of programming required to configure a PLC for use in any given paint application system is vastly reduced.

The philosophy of the invention is to allow the related hardware to perform the tasks they do well, for example, PLC's operate motion control, drive devices, communicate with the outside world via a large selection of input and output modules, and network systems. Computers, on the other hand, perform data manipulation and file handling, with a large memory capacity and at high speed.

Embodiments of the present invention provide the following advantages:
1. The end-user has freedom of choice in selecting the paint machine and PLC supplier.
2. Cost savings by allowing more machines to be controlled by a single PLC.
3. Desired high speeds of production lines may be maintained, if not increased.
4. The end-user and paint machine supplier are assisted in achieving acceptable quality of the painted article first time around ("first time buy-off").
5. The end-user is allowed a flexible configuration of machines within a spray booth.
6. Control of the system by the operator is made simpler and more user-friendly by the dedicated operator interface.
7. By providing the majority of the system in a standardized hardware and software package the costs of providing/configuring a paint application system are reduced.
8. Standard software and graphics supplied in one PC.
9. Quick and easy to use operator interface.
10. Cost savings on commissioning, operator and maintenance training.
11. Tried and tested software to site-every time.
12. Protect vital production data from unauthorized personnel and automatically stores to hard disc.
13. Reduced reliance on PLC software authors on-site.
14. Reduces PLC software code by up to 60%, easier to understand and assists maintenance departments.

15. Future enhancements of historical trending and diagnostics can be added by software revision.
16. It can be used for different applications, not only paint.

As stated, the operator interface is intelligent and can handle the control of devices other than painting machines, for example booth fans and ovens. Another application could be auto-hand colour change stations, we can control up to 48 stations from one operator interface, these examples given do not require graphic packages as the relevant dynamic and feedback information can be displayed on an LCD. Further applications of the present invention may be envisaged for example in petrochemical plants or in water control applications.

BRIEF DESCRIPTION OF THE DRAWINGS

Further features and advantages of the present invention will become clear from the following description of embodiments thereof, given by way of example, and illustrated by the accompanying drawings, in which:

FIG. 6 illustrates the structure of the database dictionary used in the present invention, in which:

DETAILED DESCRIPTION OF THE INVENTION

The following description of a preferred embodiment of the invention relates to an integrated system for the control and monitoring of a process for the application of paint in the automotive industry. The system also makes records (archives) detailing how the paint application progressed.

SYSTEM OVERVIEW

Figure 1:
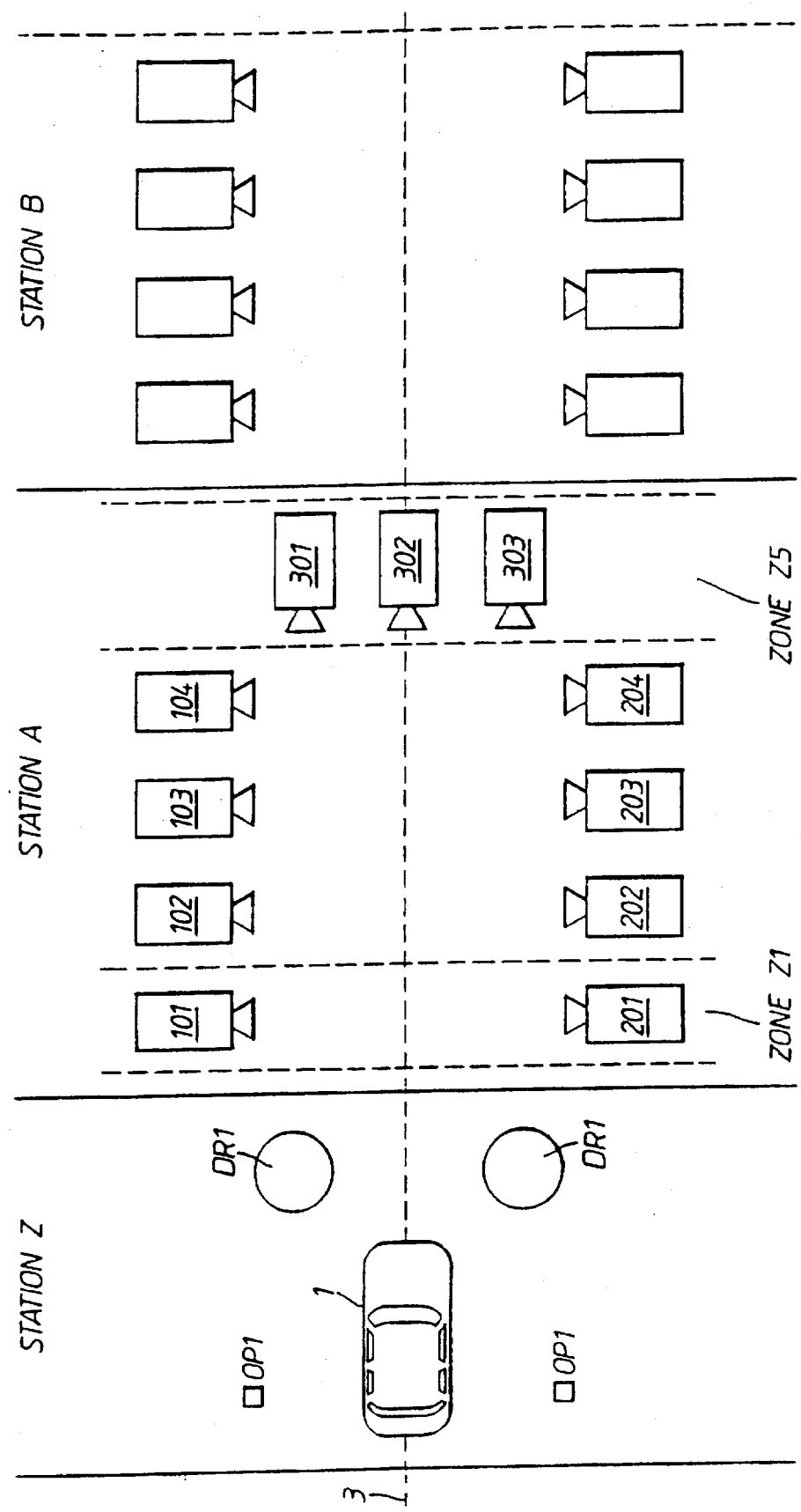
FIG. 1 is a diagram illustrating an example of a paint shop in the automotive industry.
Figure 2:
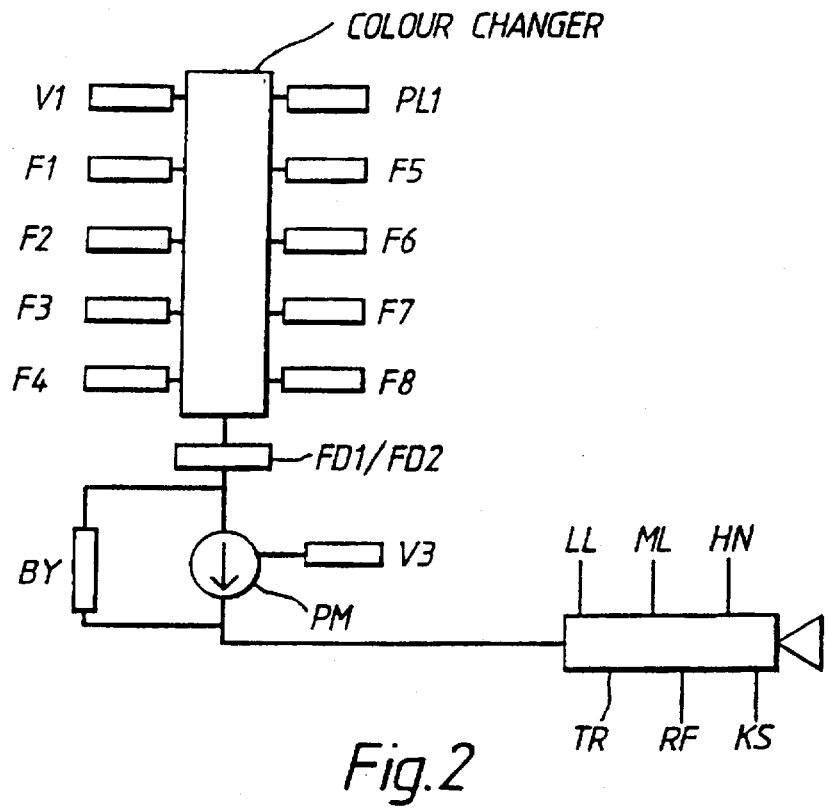
FIG. 2 is a diagram illustrating the operational parameters of a painting machine that may require control.
Figure 4:
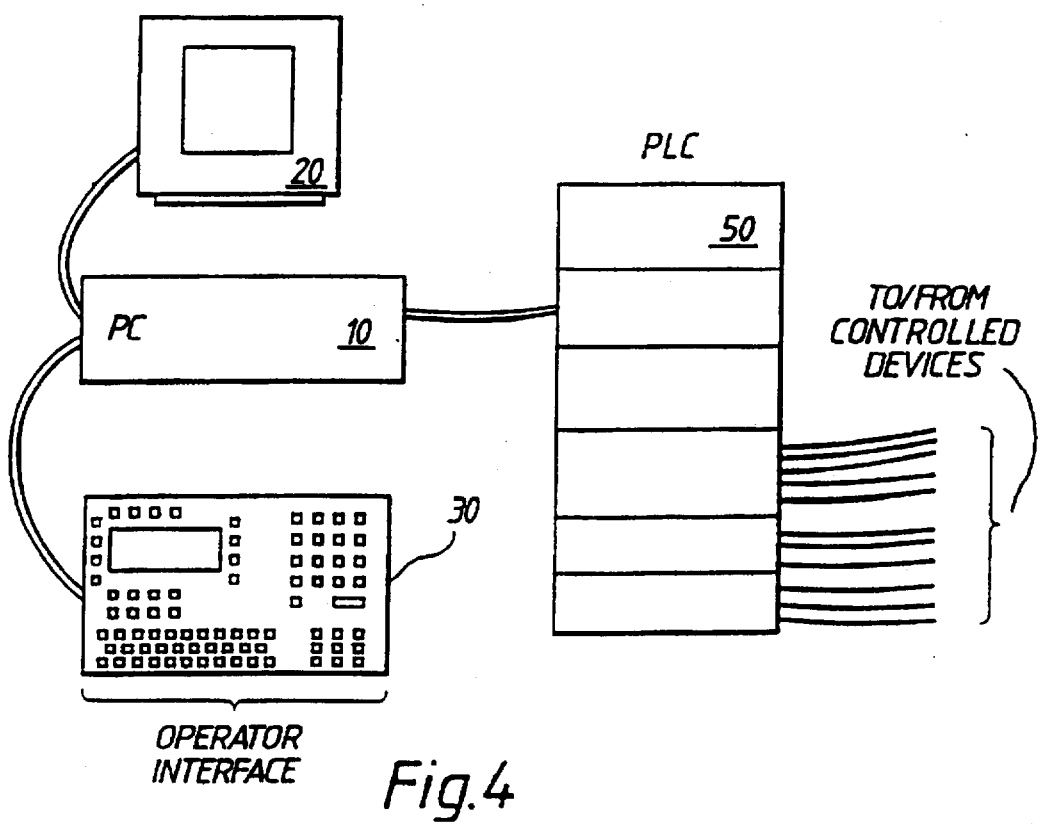
FIG. 4 is a diagram indicating the elements of an embodiment of the present invention.
Figure 3:
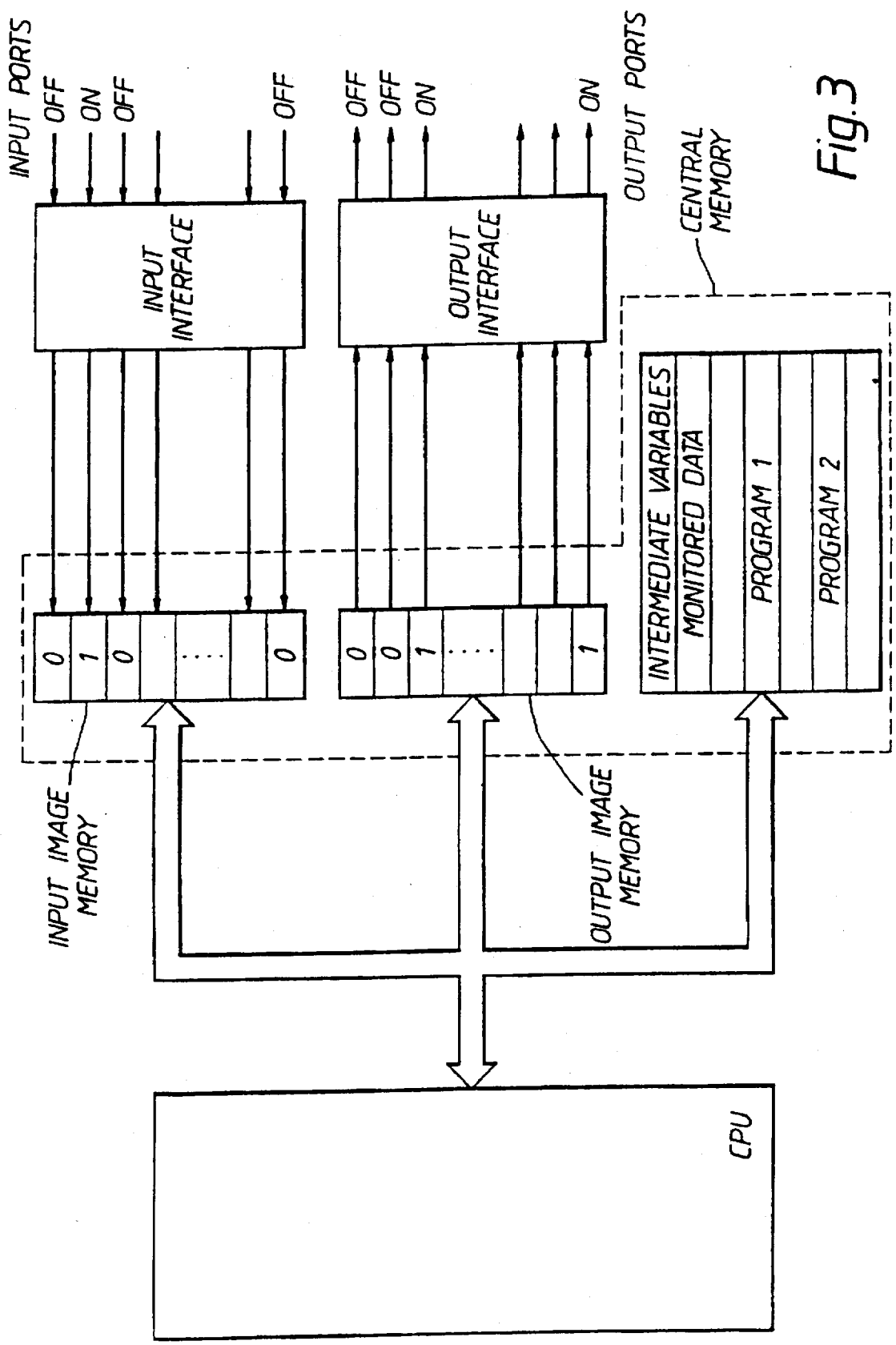
FIG. 3 is a block diagram illustrating the internal structure of a PLC.

As indicated in FIG. 4, the system includes two main components.

Firstly, the system includes an operator interface. The operator interface allows the paint booth operators easy access to the editing functions and the machine control functions, allows the process department access to the historic reporting data and trending data and provides maintenance departments with access to both areas for fault and diagnostic information.

The operator interface comprises a personal computer 10 which holds the application's operational data, a visual display unit 20 and an operator input device 30. Preferably the PC is IBM-compatible and uses a '486 processor chip or better running under the MS-DOS operating system. The PC has been programmed to perform the functions described below. The software is written in C++ code.

The operational data required by the PLC in applying paint to a particular vehicle body is stored in the PC database and downloaded on request. The desired operation of each machine to be controlled is analysed into a set of cycles according to a generalised model of the paint application process. The definition of the structure of each cycle is held in a database dictionary along with a table indicating which cycles apply to which machine. The structure of a particular cycle is defined such that it will be the same whichever body style/colour the machine is to paint but the operational data required for use by a particular machine in the cycle usually depends upon the particular recipe (i.e. vehicle body style/colour/machine combination).

The operational data is stored in files based on the cycle structure. That is, in general there will be one or more data files containing the operational data applicable to a particular machine/body style/colour cycle. The operational data required for a particular recipe is obtained by means of the PC identifying the cycles applicable to that machine (by reference to the database dictionary), retrieving data from the relevant machine/body style/colour/cycle data files and formatting that data into a standardised cycle-based message for transmission to the PLC.

The operator input device preferably is a keypad input device. This may be a dedicated device with keys configured (by software) to reflect the properties of the process being controlled. In such a case it is advantageous for the keypad to have an LCD display and a set of function keys. It is also preferable that the keypad should be able to serve as a standard qwerty keyboard. A dedicated keypad of this type allows the operator quick access to all modes to apply paint accurately and quickly, using as few keys as possible. Alternatively a standard keyboard may be used.

The operator interface provides a configurable graphical environment through which users can examine run-time data, edit the system's database and review production data.

Secondly, the system includes at least one programmable logic controller (PLC) 50 which controls the paint machines and associated equipment so that an incoming vehicle may be painted in accordance with data requested from the PC. The PLC also holds discrete run-time data reported to it by controlled engineering devices. This run-time data is reported back to the PC at regular intervals and is displayed to the user. It is assumed that the PLC has already been programmed and that it uses 16-bit digital words. The PC and PLC communicate with one another over serial or network links.

The PLC control mechanism will first be described followed by the PC database, the graphical environment and one embodiment of operator keypad. Then a description will be given of the various functions of the system.

Figure 5:
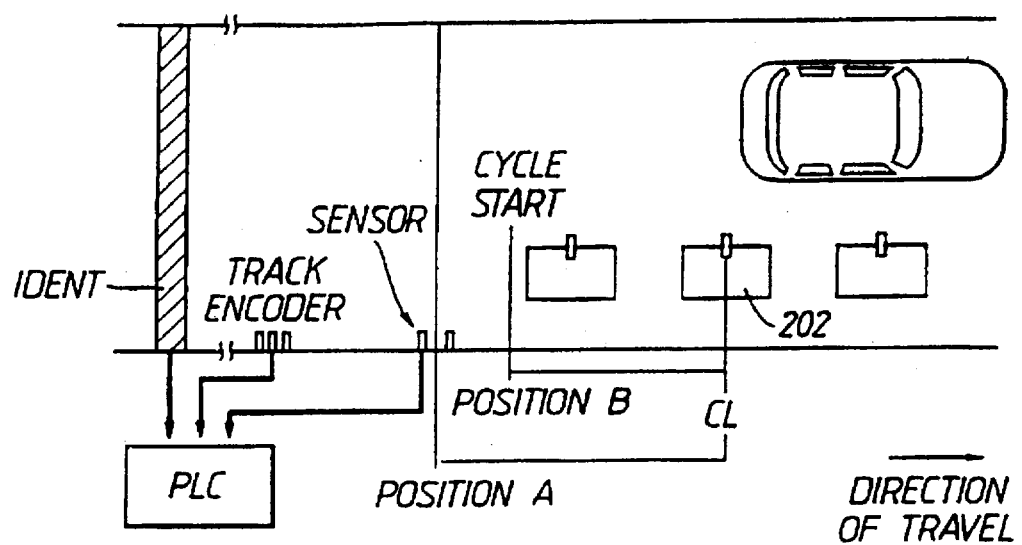
FIG. 5 is a diagram to illustrate how process control in embodiments of the invention is related to passage of a vehicle body through a painting station.

PLC CONTROL MECHANISM:

A shown in FIG. 5, car bodies enter a station through a body ident section where body and colour information is extracted and stored within the controlling PLC. The relative position of the incoming body with respect to each controlled machine is monitored by the PLC, which also receives signals from a track encoder indicating whether the conveyor is moving or not. As a body enters a pre-defined distance, A, ahead of a particular machine (in this example a bell, 202) the PLC requests the PC to send the recipe for the bell 202 with respect to the particular body/colour combination. Body entrance is detected by a sensor located at distance A from a reference point on bell 202.

Once the PLC receives the recipe it stores it in an auxiliary memory location. Thereafter it keeps track of where the vehicle is and, when it enters a pre-defined distance, B, ahead of the bell, the PLC copies the recipe into working memory location and effectively starts the job cycle. Information is typically requested at a dead distance (position A) before the start of the cycle (position B) in order to allow time for data transfer and make sure that incoming data will not overlap data being used for the working body ahead of the incoming body. Once the vehicle enters the pre-defined distance B the controlling PLC monitors the position of the vehicle and updates parameter settings to values read from its working memory location.

In addition to controlling the painting process, the PLC is responsible for recording the performance of all machines and to raise alarms due to machine or conveyor line malfunctions (usually through conditional statements embedded in PLC code). This type of data is transferred to the PC to allow the operator to monitor the progress of the painting process.

PC DATABASE:

The data storage files are automatically created by the programmed PC when the application is first generated at the start of the project. Once the system has been set up then changes to operational data are made using an EDIT function. This is explained further below.

As mentioned above, access to data in the PC database is governed according to a database dictionary based on a model of the painting process. This model is described below.

Painting machines and the associated equipment (e.g. dusters/fans/ovens) are controlled via a variable number of parameters of the following two types:

a) Boolean switches—two-state variables used to switch valves to an on or off state; and b) Regulator parameters—multi-state variables (here defined by 16 bits) used to adjust variables to a desired value, e.g. to set a pressure to 1.5 Bar, or to indicate the relative position of an element relative to the outline of a vehicle with respect to some selected origin.

A given recipe (i.e. combination of vehicle body style/colour/machine) can be considered to be made up of a number of cycles. These cycles can be defined in terms of the location of the vehicle body relative to the machine or in terms of time. During each cycle some of the parameters of the machine will vary while others will remain constant. For the invariant parameters it is sufficient to know that they remain constant over the cycle and to state the value. For the varying parameters it is necessary to indicate the points during the cycle where the parameter changes value as well as stating what the relevant values are. It is convenient to specify the points within a cycle at which a parameter changes by dividing the cycle into a number of steps the starting position of which can vary.

A typical recipe includes three basic cycles:

i) Prepaint—this cycle is necessary in order to load the new colour into the bell prior to actual painting. This is a time-based cycle that should be completed before painting starts.

ii) Paint—this cycle applies paint to the vehicle body. This is a position-related process since machine variables are adjusted with respect to the profile variation of the vehicle.

iii) Purge—in this cycle solvent is pumped into the bell for cleaning purposes. As for prepaint, this is a time-based cycle.

The above three cycles generally involve operation of valves alone. In addition to these three cycles a number of regulator cycles (i.e. cycles which involves setting of regulator parameters) and profile cycles (i.e. cycles which define movement of machines relative to the profile of the vehicle body) may need to be included in a recipe. Typically, a cycle may be set-up to activate a number of valves and set a number of regulator parameters at its activation stage. Then, at user-defined steps along the profile of the car, or as time passes, the state of a number of valves/the values of a number of parameters may be changed. Cycles can start anywhere after a vehicle body has passed a specified physical location (generally designated as that machine's zone start).

A cycle-based model of this sort is highly configurable while at the same time enabling paint application processes to be described in great detail. In the preferred embodiment of the invention the structure of each particular cycle is defined so as to be the same regardless of the ident of the vehicle body being processed. The operational data relating to the cycle will vary, as will certain detailed characteristics of the cycle such as start point and start positions of steps within the cycle. The definition of cycle structure is set-up in a database dictionary whereas the operational data and detailed cycle characteristics are held in data files. The database dictionary is a dictionary of booth resources which embodies the cycle-based model of the paint application process. This dictionary is used by the system so as to properly allocate data and to enable recipe data to be accessed and formatted.

Figure 6A:
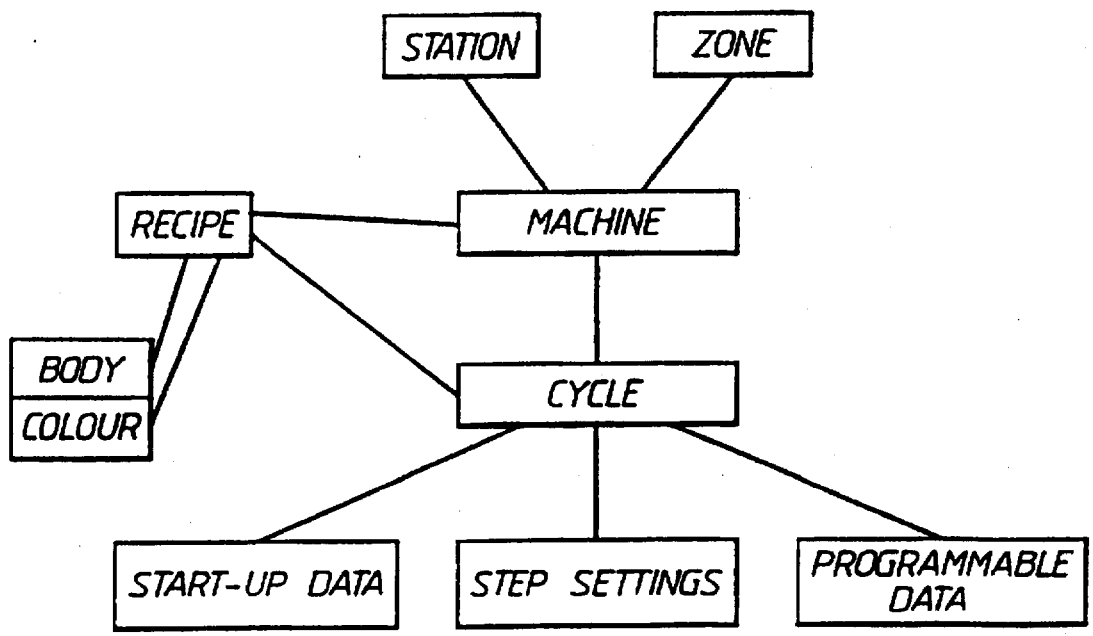
FIG. 6a) shows the dictionary in relational form.
Figure 6B:
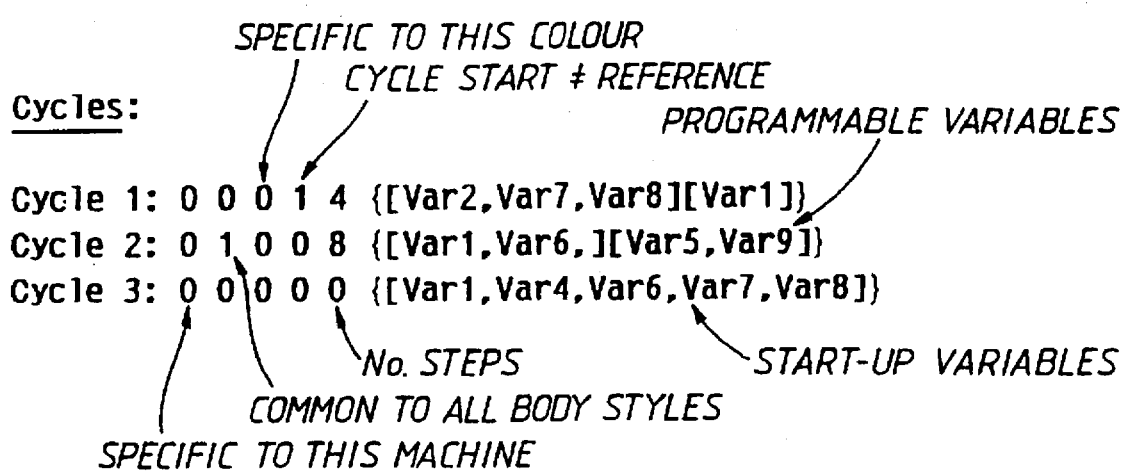
FIG. 6b) gives an example of a very simple dictionary.

FIG. 6a) shows the structure of the database dictionary in relational form, whereas FIG. 6b) indicates how a simple dictionary might read.

Station: contains a description of all the stations controlled by the system and their contents in terms of machines;

Zone: similar to station, this table groups machines based on their topography in the booth (i.e. opposite facing machines, roof machine, etc.).

Machine: contains a description of all machines included in each station and relates a machine to a given set of cycles that will be included in a recipe.

Cycle: contains header information about each cycle and lists of indices identifying start-up variables and programmable variables. In the preferred embodiment of the invention the header is composed as follows:

First three bits identify whether the cycle data varies as machine, body style or colour vary. A "1" indicates that the cycle data is global in the relevant respect. By having these indications of common or global data it is possible to provide a single data file for the cycle in respect of the common ident parameter. For example, if cycle 1 does not vary when different body styles are involved then for the given colour and machine it is not necessary to store separate data files representing the operational data and cycle details required for the individual body styles.

Next bit indicates whether the start of the cycle corresponds to a reference point (usually zone start) or whether it begins at some other point. In the latter case the start point of the cycle will be specified in the data file.

Fifth bit indicates the number of steps in the cycle. If the cycle is divided into steps then the start points of the steps will be defined in the data file.

Start-up data: contains data for all start-up parameters associated with the cycle. Through rules of inheritance these parameters also belong to the machine that includes the cycle. Start-up parameters are assigned a value which takes effect at the beginning of a cycle and lasts until its completion.

Programmable data: contains values for all programmable parameters associated with the cycle. This is a two-dimensional table because values are entered for each variable for each step.

Step settings: contains the positional information defining the position of all steps in a cycle.

Body/colour/machine: these tables contain the actual descriptions of the respective entities.

Recipe: finally, this table contains information required in order to efficiently retrieve sets of cycle data from the database.

The above description of the database dictionary relates to the operational data (including cycle fine structure) held in the PC database. However, additional information is held in PC memory. For example, as the paint application process progresses the PLC receives information from monitoring devices in the booth. This information, or statistics derived from it, is retrieved by the PC from the PLC at regular intervals and is stored in the database. This data may also be arranged according to the data model but is held in an area of memory reserved for monitored run-time data rather than the area reserved for operational data.

The database dictionary is used by the system when accessing and formatting recipe data to be fed to the PLC, and when displaying operational data or monitored data on the graphical user interface, for example during editing. This is described further below.

GRAPHICAL ENVIRONMENT

According to the preferred embodiment of the present invention the above-described database is provided in association with software which also provides a graphical environment. This graphical environment displays operational and monitored data in diagrammatic form so as to render it more easily understandable and easier to manipulate by the operator. A library of screens are configured and selectable to suit any paint application machine, and can be upgraded by software revision as technology changes.

In contrast to general-purpose control systems, the graphical environment provided by the preferred embodiment is not made up of a list of pages created ad hoc and accessed sequentially (or via a system navigation interpreter). Instead it lets the user configure lay-outs and defines them as examples of certain hard-coded page types with standardised functionality, as mentioned above.

Thus, for example a "Cycle Edit" page type is defined. The user can create a separate instance of this page type for each cycle defined in the database dictionary. However, the page type determines what functions will be performed when any instance of this page is activated and deactivated. In this example, when an instance of the Cycle Edit page is activated the PC will access the operational data relating to that cycle and display it on the screen in the lay-out as configured by the user. When this page is activated and the user activates a save key then the PC will take the operational data values as then present in the page and transfer them into the appropriate locations in the database so as to effect the edit.

A page instance in the graphical environment is made up of a set of elements such as circles, lines, text items, etc., that can be placed anywhere on the screen to portray static, dynamic, editable or read-only information. A number of element types are supported in the preferred embodiment of the invention allowing considerable flexibility in configuring pages.

Page instance elements can be classified in two generic categories:

a) static—these are simple graphical elements that never change in terms of their colour, shape or context and are placed on a page for aesthetic or explanatory purposes only.

b) dynamic—these elements are associated with system variables (operational data element or monitored run-time value) and change according to variations observed or expected in the linked variable. Changes can be portrayed in a number of ways, such as: changing colour, size, location and context. Dynamic elements can also be edited. Editable dynamic elements provide the channel between the user and the system database and will let authorised users assign a new value to any system variable.

An EDIT program in the PC software allows elements of the page instances to be created simply by creating the element and positioning it anywhere on the screen. In addition the EDIT program provides a mechanism by which an element can be linked to one or more system variables for graphical representation/monitoring/editing.

In the preferred embodiment of the invention the following page types are defined.

Manual Ident Control—allows the user to examine a stack of cars within the booth, through animated graphics. Information about the included cars is read from a set of PLC words and can be manually changed before an incoming vehicle approaches a user-defined positional limit.

Station Performance—each instance of this page is configured to portray higher level monitoring information applicable to a specific station of machines. This may include gun performance information, value adjustments, etc. This page can allow the user to edit information applicable to the station as a whole.

Machine Monitor—instances of this page can contain graphical/textual information monitoring the run-time state of all gun valves and other parameters associated with a particular machine. They can be set to show motion of a painted vehicle, with respect to the centre-line of the machine and provide the functionality to test the machines when running the production line in manual mode.

Cycle Edit—in the preferred embodiment the user is allowed to create one instance of this page for each process cycle, in a manner that suits any editing style. Such instances can be configured to show stepped programmable cycle data in graphical or textual mode and, in the preferred embodiment of the invention, must contain editable elements so as to provide the channel between the user and the system's database. The primary function of this page is, nevertheless, to allow the user to edit a specific database cycle and to that end it provides advanced editing utilities such as data copy, paste, revert, etc. When this page is activated it will retrieve the recipe associated with the selected machine, body and colour and will allow the user to edit the data for the cycle that the page represents.

Auxiliary—instances of this page can be created to display sets of monitoring information and to allow editing of process variables outside the scope of the PC database. Instances may include, booth monitoring, shift editing, alarm graphical representations, etc.

Production trends—as with auxiliary pages, production trend pages display sets of monitoring information concerning production statistics. In this case machine, body and colour keys can be used specifically to select a sub-set of the selected range, while the user can also browse through range values recorded over the last 30 production shifts. Data sets can be printed or exported to a file. The run-time data of the ranges shown here is resident in the PLC memory and calculated by the PLC.

Alarm Log—one instance of this page is required to display active alarm descriptions, acknowledge states, durations and occurrences. This page allows the user to scroll through active alarms. Once an alarm is selected an alarm prompt is shown (in the preferred embodiment of the invention on the provided keypad display) to inform the user about the course of action needed to cure the situation that activated the selected alarm.

File View—instances of this page can be used to display system maintenance data saved in daily files. data such as alarm activation, database changes, etc., are typically saved daily and can be retrieved and printed via this page. A special instance of this page, the "note pad", allows the user to record notes/observations raised through the current shift. The note pad can be used to implement a company documentation policy with respect to documenting daily production routines.

User Log—this page can only be accessed by the system administrator in order to assign/remove system editors. The preferred embodiment of the system includes three authorisation levels, including: "Administrator" who is responsible for controlling who has access to the system by setting user passwords, "Editor" who can freely edit and monitor data and "Operator" who can only view data across the different pages of the user interface.

Before describing navigation through the pages of the graphical environment it is helpful to consider the operator input device.

Figure 7:
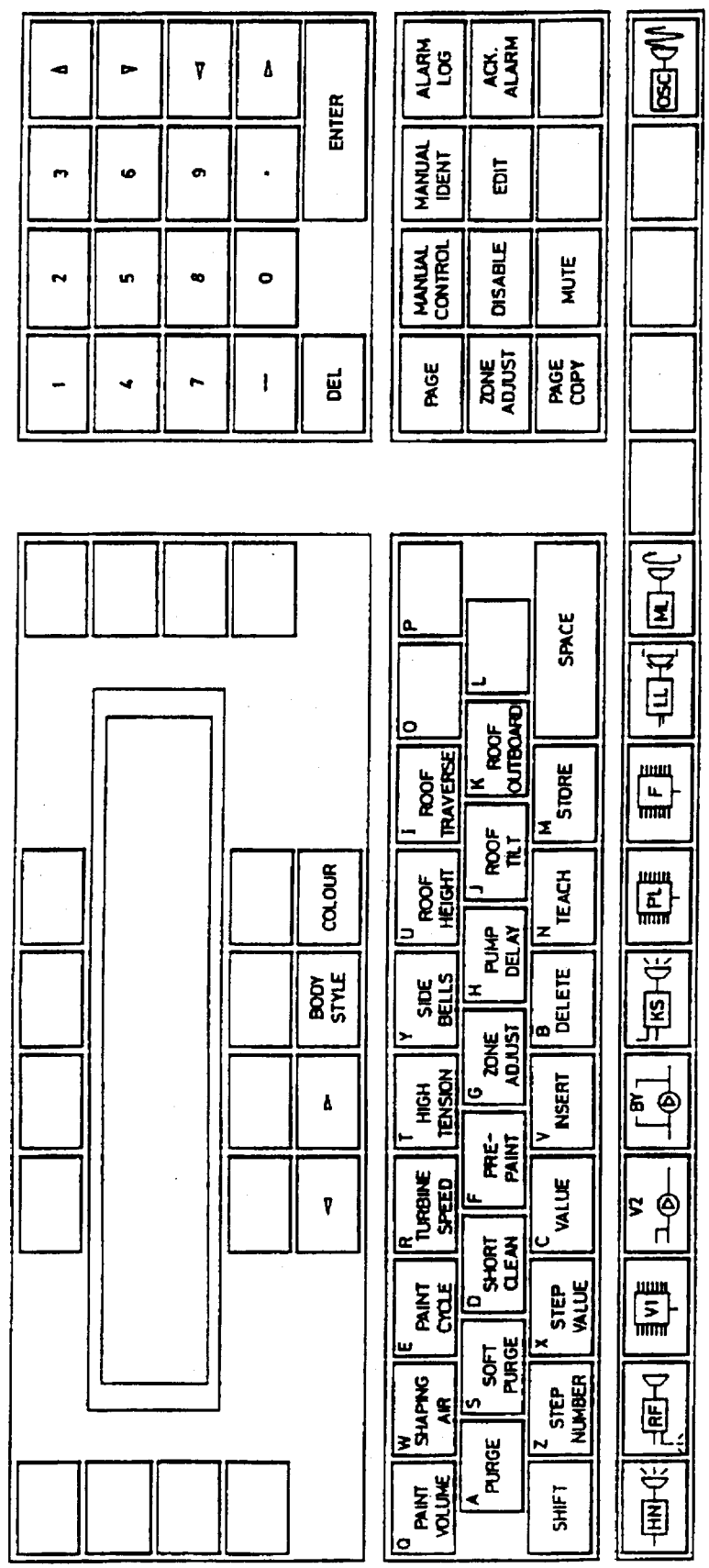
FIG. 7 shows an embodiment where the operator input device is a dedicated keypad.
Figure 8:
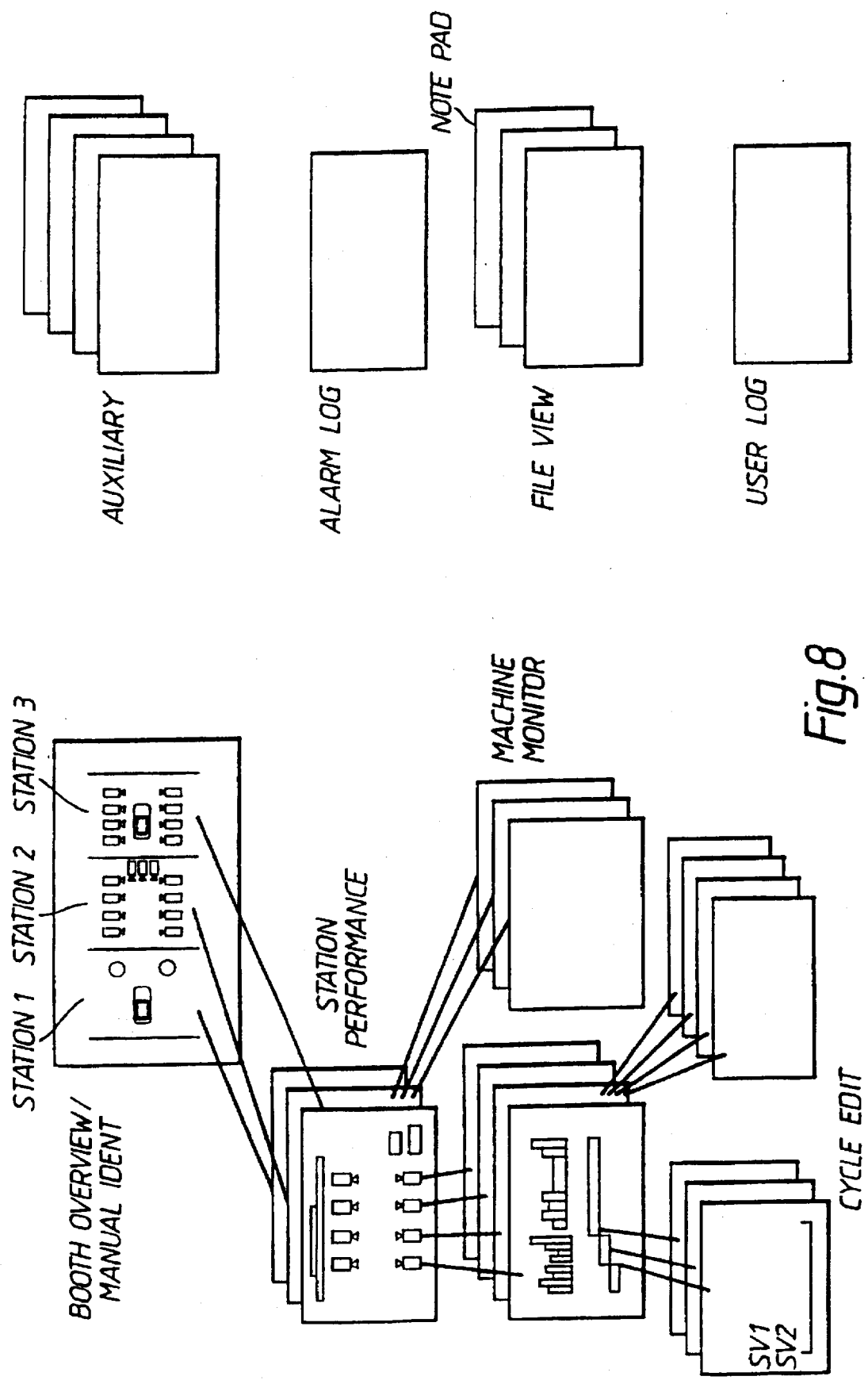
FIG. 8 gives examples of instances of page types in the graphical environment provided by the preferred embodiment of the invention.

OPERATOR KEYPAD:

As mentioned above, the system is particularly simple to use if the operator input device is a keypad with configurable keys. An example of such a keypad is shown in FIG.7.

The illustrated keypad has a four-line message area for help and diagnostic information. Swift data entry and navigation around the graphical interface are provided via numeric keys for entering parameter data and by incremental and directional keys. Keys corresponding to individual paint machines are provided around the display. These keys are software-configured so as to reflect the topography of machines in the different stations that can be selected. The function keys north, south, east and west of the LCD are used to select the appropriate gun within the selected zone which has been called up on the display. The paint gun keys can accommodate a maximum of 12 guns/bells per station and the roof machine keys accommodate line flow from the left or right, any requirement over 12 bells or guns is simply split into two zones. Multiple stations can be controlled by using the scroll keys to move from one station to another.

There are 10 mode keys that control the operation and navigation of the system. Another 28 parameter keys are also provided assigned to specific functions, for paint volume, shaping air, roof machine, side machine, manual ident etc. The latter keys also double up as a qwerty keyboard for text entry into the various log files that are available. Valve keys are also provided with representative symbols printed on them to provide fast and easy manual access.

NAVIGATION IN THE GRAPHICAL ENVIRONMENT:

The following description of navigation between page instances of the graphical interface is given an terms of the keypad of FIG. 7 being the operator input device controlling selection of pages, performing edits, etc. Page selection is automatic and controlled by the operator interface for ease of operation. However, if required, any page can be selected from any point in the system.

On start-up of the PC program the VDU displays the default screen (Booth Overview) screen. This shows the bodies moving through all the stations that the system is controlling, i.e. duster, basecoat bells, reciprocator, etc. General monitoring conditions are displayed such as doors open, conveyor status. The operator keypad may be used to select any body, this will provide access to an appropriate instance of the Manual Ident page. There the identity of the body can be edited in the event of a wrong selection, provided that the body has not travelled too far into the booth. Animation graphics as described below are used to show an appropriate body shape for the type moving along the screen.

From the Booth Overview screen individual stations can be selected, using the scroll keys on the keypad, in order to display a more detailed process graphic of all the machines for one particular station. In the page instance displaying a particular station the animation facility is used to display operation of the machines as the body passes by. A zone adjust facility is incorporated at this level. Graphic indications of whether a machine is painting, purging, prepainting, etc. are shown here. A disable mode key on the operator keypad can be used to toggle the machine keys to disable/enable any machine in the displayed station.

Individual machine monitoring can be accessed by pressing an appropriate one of the machine keys disposed around the keypad display. A detailed graphic representation is given of the operation of the machine with respect to the body passing it; animation techniques are again used here. In the preferred embodiment of the invention all the desired and actual values for the parameters of the selected machine are shown on this page. The desired values are obtained by accessing of the database and the actual values are obtained from the PLC.

Manual operation is enabled by a manual mode key provided on the operator keypad. This calls up the Manual page instance for the selected machine. All manual operations are available to the operator through the keypad.

In any page parameters may be edited by pressing an edit mode key on the operator keypad followed by the parameter key corresponding to the item to be altered. It is preferred that an extra key stroke should be required to effect the edit. This may be a Save key to enhance user understanding.

Auxiliary pages relating to plant specific functions such as conveyor stops, booth fans, etc., may be accessed using dedicated keys on the operator keypad or via an index of auxiliary pages.

OVERVIEW OF PC FUNCTIONS:

The PC-based software of the preferred embodiment of the invention is an event-driven program developed to respond to user and PLC requests and monitor the process state efficiently. In broad terms, the system's kernel continuously performs an iteration around a run cycle comprising the following tasks:

Advance Clock—forwards the system clock and shift counter. In the preferred embodiment of the invention the PC internal clock is used to keep track of production shifts. When an "end-of-shift" signal is detected the PC performs log file maintenance before it goes into idle time. During the idle time the user can export production data to a printer or to external data analysis software. A unit time of one second is used to restrict the kernel dwelling within the same run cycle.

Serve PLC Requests—detects and/or serves PLC data requests by selecting appropriate data from the database and despatching the data to the PLC. Typically, three defined "request words" resident in the PLC memory will contain the request in terms of the zone to be served and the body/colour assignment. Once a request is read by the PC, a recipe (including all painting cycles) for each machine in the zone will be formed from the cycles stored in the PC database. The recipe for each of the N machines involved will then be despatched to the PLC within the next N cycles of PC operation. Once data transfer is complete the PC will set the "request words" in the PLC to zero so as to let the PLC reset them when it has its next data request. This function is explained in more detail below.

Update Control Sensitive Help—this task will update a displayed message which, in the preferred embodiment, is provided on the LCD of the operator keypad. The help message is used to provide help information such as alarms and diagnostics telling the operator if an incorrect key has been pressed, system navigation messages telling the operator how to move from the current position within the system and what that position is (i.e. a brief description of the current page or the selected element within a page), and database editing messages telling the operator what inputs should be made at any given level of operation when editing process data or other factors (such as the machine constitution of the active station). The help facility can be switched on and off by the keypad.

Monitor Process Alarms—read and process active alarms and maintain history of alarm acknowledgements. Process alarms are raised exclusively by the PLC software and stored in PLC-resident alarm words. The PC reads all alarm words, maintaining an internal list of active alarms and keeps a note of the duration of each declared process alarm and the number of times it has occurred. Active alarms are appended to a shift alarm log file once they are acknowledged by the user and cleared by the PLC. The bottom line on the displayed screen is conditioned to display the first alarm that is detected and, when it has been acknowledged and cleared, to display the next alarm, and so on.

Update Stage—a PC stage is associated with an animated window to the production line that can reside in a page of the graphical interface. If an animated stage is active then the PC will: read a list of PLC words that contain the position and type of vehicles within a pre-defined segment of the production line and draw each car entry in the calculated screen location corresponding to the PLC word. (The graphical representation of each defined car body having been input into the system on start-up and being stored in memory). This type of animation will let the user view any movement within the process environment with minimum configuration.

Update Interface—this task is associated with updating the graphical interface's run-time front-most page and includes routines concerning the maintenance of data used internally by the PC and for updating the context and style of dynamic background and foreground page elements. The PC reads a range of PLC words in order to get the latest value of linked page elements and updates the screen accordingly.

Get Next User Event—gets a user entered input from the keypad or other operator input device and transforms it into a valid PC command. If the user has selected an editable text item, key strokes interpreted as edit commands and are the corresponding characters are inserted into the activated edit element. If no request is received then an "idle" command is generated.

Security Command Check—checks the issued command against the authorisation level of the user. If the current system user is not an "Editor" then edit commands will be disregarded.

Handle User Command—handles user commands such as machine or station selection, data editing, etc., according to the effect the command has on the graphical interface's front-most page.

The above list of tasks can be momentarily exited when specific system-defined critical situations occur. Critical situations can be raised throughout the execution of any of the above tasks and mainly concern "end-of-shift" signal, inability to communicate with the PLC and failure to access or write database information.

USE OF THE DATABASE;

Input of working data

In the bulk of the above description it has been assumed that the operational data has already been loaded into the PC database. However in practice data loading takes place as outlined below.

On set-up, the database dictionary is configured so as to specify the nature and number of devices to be controlled, the cycles each machine performs when applying paint, which variables are involved in each cycle, the nature of those variables, etc. The PC can determine from the configured dictionary what size and structure of data file it expects for each cycle in relation to each machine/body style/colour combination. Before any data values have been loaded these data files do not physically exist. However the operator can access page instances relating to the relevant machines/cycles for editing. The initial page instances will have zeroes in place of the relevant operational data. The operator can then operate the input device so as to select particular data items, specify a value and save the change. After editing, the PC creates the necessary data file for holding the loaded data.

Provision of working data

As mentioned above the PC monitors the PLC for data requests in every run cycle of its operation. When a data request is detected the PC accesses database and formats the accessed data, as follows. On detecting a PLC data request the PC reads the three PLC request words into a buffer. The PC determines which machines are in the zone identified in the request words by reference to the database dictionary. The recipe data, in relation to the vehicle body and colour identified in the request words, for the first of those machines is accessed, formatted and sent to the PLC in the first subsequent run cycle of the PC. The data is written into a PLC memory block termed Machine Standby (Auxiliary) Data described further below. In the next run cycle the PC transmits the recipe data for the next machine in the zone, etc.

The recipe data is accessed as follows:

1) the PC refers to the database dictionary to ascertain which cycles are defined for the machine in question;

2) then, for each cycle in turn, a) the PC refers to the header portion of the cycle structure definition in the database dictionary to determine whether the cycle data is common to a different machines/body styles or colours.

i) if the cycle is unique to the particular machine/body style/colour then the PC forms a pathname including the machine index, body style index, colour and cycle. For example if machine index=01, body style index=02 and colour index=03 then the relevant data file for cycle n could be given a pathname C010203.n.

ii) if the cycle is common to different machines/body styles/colours then the relevant data file is named as if the index of the common parameter was 0 and so that part of the pathname is set to zero. Continuing the above example, if cycle 5 for machine 01 and body style 02 is common for all colours then the relevant data file could be names C010200.5

3) Again accessing the cycle header the PC checks whether the cycle start point is at reference or is variable. If the start point is variable then the PC accesses the data file to see what the start point is. A word representing the cycle trigger point is created and becomes the first word of the data message to be sent to the PLC.

4) Again the PC refers to the cycle header in the database dictionary to determine how many steps there are in the cycle.

5) The PC refers to the database dictionary to ascertain which variables are defined as start-up variables (i.e. variables which are set at the beginning of a cycle and hold their value until the end). The start-up values for these variables in respect of this body style/colour and this cycle are retrieved from the database. The PC arranges these values into an order reflecting the address structure of the PLC. Preferably (as described below) the values of digital switches are appended to the data message before the values of analogue start-up variables.

6) The PC refers to the data file to find the start points of the steps defined for the cycle in question. A set of words is generated representing the start position of each of these steps. These words are appended to the data message.

7) The PC refers to the database dictionary to ascertain which variables are defined as programmable variables, i.e. ones whose value changes at one or more of the step boundaries. For each of the programmable variables the PC retrieves the value of that variable in each step of the cycle in respect of this body style and colour. The retrieved values are arranged into an order which reflects the address structure of the PLC.

Preferably the set of values for the first analogue programmable variable are grouped together and appended to the data message, then the set of values for the next analogue programmable variable are grouped and appended, and so on for the remaining analogue programmable variables. Next the changing values of the digital programmable variables are represented in a set of data words equal in number to the number of steps (or an integer multiple thereof if there are a large number of digital switches). The values of each of the digital switches during the first step of the cycle are grouped together in the first data word (assuming that there are 16 or fewer programmable digital variables such that a single 16-bit data word has sufficient capacity). The next data word is arranged to contain the values of the digital switches during the second step of the cycle, etc. These data words are appended to the data message for transmission to the PLC.

Interaction with Graphical Interface:

When a particular page type is set up a number of editable items and monitored run-time items may be included in the definition of that page type. The graphical representation of the editable or monitored item may vary but the data corresponding to that item must be correctly identified by the system so that it can be accessed from the database.

The definition of the page instance identifies the type of data element which corresponds to each editable or monitored item. For example, in a page "Cycle Edit" there may be an editable element "Start point of Step 2". In that case the PC identifies that the editable item relates to the start point of a step within a cycle.

As mentioned above, the graphical interface starts up with a booth overview and the PC monitors the idents of the vehicles in the booth. When the operator selects a particular station then the PC program notes the ident of the vehicle body in the selected station. The PC accesses data from the database for each of the types of editable/monitored run-time items on the page instance in respect of the body style/colour corresponding to the ident for the vehicle in the selected station. The retrieved data is converted into the appropriate graphical representations as configured by the user.

Should the user change editable items in a page instance then the PC identifies which type of element corresponds to the edited item and, based on the ident data, alters the appropriate database data element.

OVERVIEW OF PC/PLC COMMUNICATION

As described above, several modules of the PC program use and/or modify PLC-resident data. In general this data is maintained by the PLC in isolation and the PC is only required to retrieve it and portray it in a user-defined form on the graphical interface. In other cases both the PLC and the PC collaborate in the maintenance of blocks of data which nevertheless reside in the PLC alone. However, a third case concerns data which resides in and is maintained purely by the PC although elements of this data need to be transmitted to the PLC on request.

Based on the predictability of data types involved in the control of paint spray applications, and the standardised fashion in which the PC treats data, a strategy has been evolved whereby data within the PLC is stored in an organised manner that requires no additional PC programming for different PC installations. PC to PLC communication is handled via software drivers developed specifically for the PLC used in a specific job. A typical implementation according to the preferred embodiment of the invention will require the following PLC-resident blocks of data:

Alarms—this type of data is enclosed in a PLC-resident memory block as a sequence of words. A group of 50 words can refer to up to 800 Alarm cases whose status is stored within a single bit of the enclosed 16×50 matrix. Alarm data is maintained continuously by the PLC software according to the process states and is monitored by the PC for archiving and monitoring purposes. Addressing the "alarms" memory block is a simple matter. In the typical case where relative addressing is used, it is only necessary to specify the letter defining the appropriate memory block, the memory offset from the start of that block and the distance (in terms of number of alarms). For example: letter=R, memory offset=100, number of alarms=400.

Body Identification—body identification data includes information about all bodies travelling through the controlled booth section. This information is grouped per body entry and contains 4 16-bit words including: updated location of the entry with respect to the beginning of the controlled booth segment, entry body style index, entry colour index and entry status. Up to 20 bodies can be continuously tracked by the PC/PLC thus using a maximum of 80 words.

The segment of PLC memory in which body ident data is located starts with a 16-bit header that identifies the distance within the segment (measured from the start) within which bodies can be manually identified (i.e. the user can manually alter the setting). Body ident data alone is used by the PC's stage manager to adjust any animation windows on the graphical interface.

Zone requests—zone requests are issued by the PLC in order to get data for a specific zone about to paint an incoming vehicle body of known colour and body style. A request is issued by the PLC simply by filling a particular memory location with the data of 3 words that include the zone index, the required body style and colour. The PC monitors that memory location and when it identifies a request will decompose it into the machines included in the zone. The PC will then retrieve and format the associated database recipe data and write it into the PLC-resident "Machine Standby" memory block. Once all data is despatched the PC is responsible for resetting the "Zone Requests" words to zero so that the PLC can update them when it next has a data request.

Machine Standby (Auxiliary) Data—Recipe data for a particular machine, edited by the user, and saved within the PC database will, upon request, be transferred to a predefined memory address of the PLC memory map. It is evident that machines controlled by the PLC can vary significantly, thus the memory size allocated to each machine cannot be predefined as a general item. However, in order to let the PC collaborate efficiently with the PLC a well-defined data protocol is used on both ends of the system. This protocol allows any number of programmable cycles to be included in a recipe and formatted as illustrated in FIG. 9.

Figure 9:
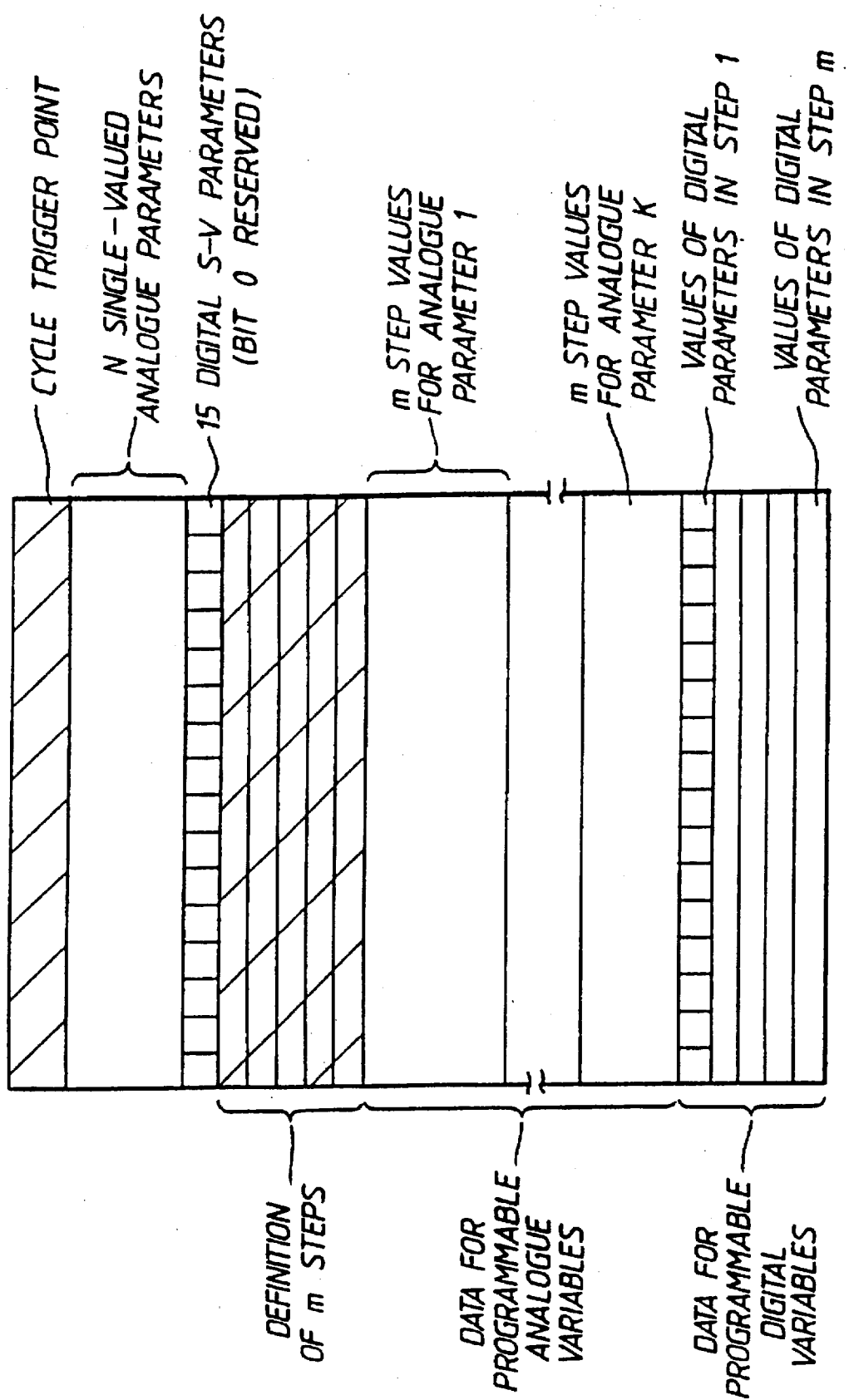
FIG. 9 illustrates the standardised format in which data is transmitted from the operator interface to the PLC according to the preferred embodiment.

The message format shown in FIG. 9 is cycle-based and the message block for each cycle may be characterised, as follows:

1) 1 header word defines the trigger position of the cycle with respect to the zone for that particular machine;
2) 1 word describes the state of up to 15 1 bit Boolean switches. As above, these switches take effect at the beginning of the cycle and last to its completion. The first bit of this word is reserved to indicate the nature of the cycle (time/distance-based);
3) A set of words describing the value of single-valued 16-bit analogue parameters. These parameters will take effect at the start of the cycle and last to its completion;
4) A set of words describing the start position of any number of programmable steps;
5) A set of words describe the values of an analogue parameter with respect to each defined step in the cycle. A number of sets may be required if there is more than one programmable analogue variable in the cycle;
6) A set of words equal to the number of steps in the cycle, these describe the state of up to 16 switches in each step.

Machine Performance(Working) Data—this data block is reserved for internal PLC use. Data is copied to this block from the Machine Standby block, in order to be used as the working data. This data area is beyond the scope of the PC as it will never be accessed for monitoring or writing.

Machine Manual Data—manual data concerns machine settings when the booth is running on manual mode. this data segment is resident within the PLC and is typically written to by the PC. In fact, the PC can write to this PLC-resident memory block at any time although settings will only be manifested when manual booth mode is physically selected. Manual data can contain any number of words to describe parameter/valve settings, or any other controlled variables (such as trigger cycle, etc.), used by the PLC manual program. However manual data for a single gun is set in a well-defined manner that includes a word for the triggered cycle, a list of words for all machine operating parameters and one or two words for the states of 16 or 32 bitonal valve settings.

Continuous (Logged) Monitoring Data—these data blocks are associated with production statistics that are collated (and optionally calculated) by the PLC and read by the PC in order to allow further statistical analysis of the paint process. For example, if we decide to monitor the or each colour during a shift, "Paint Usage" will be defined as a set of words including an indication for each colour.

This type of data is organised in terms of a single key index (machine ID, body ID or colour ID). For example, we may decide to group "Paint Usage" variables relative to each body style. Carrying on from the example in step 2, "Paint Usage" set must have a set of instances (one for each body) each containing the same number of words (one for each colour). In order to access this type of information the PC needs just the data set offset, the number of words within the set and the key index.

In addition to the memory blocks described above, a suitable amount of PLC memory must be reserved in order to keep auxiliary monitoring data concerning the process and the PLC itself. This data can be portrayed by the PC on the graphical interface in any user-defined format. This type of data cannot be defined beforehand but it will simply by made up of a list of words accessed by the PC via a memory index.

By using the present invention the PLC processor can be reduced in size, or the spare capacity can be used to control more machines from 1 PLC than was previously possible. The preferred embodiments of the invention require only 30% of the usual PLC software code (i.e. that part relating to machine movement) and only 10% of the PC/graphic database software code without any restrictions to specified plant. Indirect savings are also gained by reduced operator and maintenance training, reduced commissioning time and easy archiving of stored data. Furthermore, down-time should be improved by enhanced diagnostics and trending facilities.

The above description of a preferred embodiment of the invention refers to a graphical interface incorporating a number of pages it is to be understood that the number, content and layout of these pages may be altered without departing from the invention. Similarly, although the operator input device has been described as a dedicated keypad other known input devices may be provided, such as a mouse; a screen sensitive to touch, to a light pen or to a stylus; a tablet and stylus, etc.

Furthermore, in an alternative embodiment of the invention the operator input device may be made intelligent. In such an embodiment the operator input device performs the editing functions, it takes the old data, changes it and passes it back. This removes complicated table to pointer register software in the PLC and reduces the PLC software code by 25%. It could be used without the PC database and used directly into the PLC using one of the three RS232 communication ports provided on the input device. The input device used on today's technology without the PC database would reduce the total software development time by 25%.

It is to be understood that variations can be made in the specific embodiment of the invention described above. These changes include, but are not limited to the following. The PLC need not use 16-bit data words. The database could be implemented using a mass storage device rather than the memory resident in the PC.

We claim:

1. Intelligent data storing apparatus for use in a control system comprising at least one programmable logic controller (PLC) for controlling one or more devices to perform a process, the process having a number of variants, the apparatus comprising:

receiving means for receiving a data request from said PLC, said data request including (i) a code designating a process variant and (ii) a code indicative of one or more designated devices requiring control in order to implement the process variant;

database means comprising (i) a database holding operational data elements, and (ii) a database dictionary defining (a) a tree structure relating operational data elements to particular variants of the process and particular devices and (b) a structure of one or more cycles by which each device performs the process, the structure of the each cycle being constant regardless of which process variant is designated;

the database holding the operational data elements grouped into files corresponding to particular combinations of device, process variant and cycle; and retrieving means, responsive to said receiving means, for identifying the applicable cycle(s), for retrieving operational data elements from files in the database applicable to the designated device, process variant and cycle(s) using pathnames corresponding to the tree structure specified in the database dictionary and for formatting the retrieved data elements into a block having a predetermined structure for outputting to the PLC.

2. Intelligent data storing apparatus according to claim 1, wherein the retrieving means is for formatting the retrieved data into blocks of data, each block comprising operational data elements required by the designated device to execute a cycle of the process variant.

3. Intelligent data storing apparatus according to claim 1, wherein the database dictionary definition of cycle structure includes a flag indicating when a cycle is common to a number of devices, and the retrieving means is for detecting the flag and, when required, for retrieving the operational data elements relating to that cycle from the same file in the database whichever of said number of devices is designated.

4. Intelligent data storing apparatus according to claim 1, wherein the database dictionary definition of cycle structure includes a flag indicating when a cycle is common to a number of process variants, and the retrieving means is for detecting the flag and, when required, for retrieving the operational data elements relating to that cycle from the same file in the database whichever of said number of process variants is designated.

5. Intelligent data storing apparatus according to claim 1, wherein the data request indicative of one or more designated machines is a code identifying a physical area of an installation and the retrieving means is for referring to the database dictionary to ascertain which device or devices are located in the area identified by the code and to retrieve data appropriate to that or those devices.

6. Intelligent data storing apparatus according to claim 1, and further comprising:

means for generating and displaying graphical representations including page elements corresponding to data held in the database or accessed from the PLC, said graphical representations being instances of a plurality of page types, the functionality of each page type being defined in compiled code.

7. Intelligent data storing apparatus according to claim 6, wherein at least one page type is defined to permit database data to be displayed and altered by operation of an associated input device.

8. Intelligent data storing apparatus according to claim 6 for use in association with a process involving interaction of the one or more devices with an object moving relative thereto and in which the PLC tracks the relative position of said object, comprising:

means for monitoring the location of the object by accessing a location in PLC memory; and means for generating a graphical representation including an image representing the physical disposition of the one or more devices to be controlled; and means for overlaying a stored representation of the object over said image at a location corresponding to the location of the object as determined from the PLC.

9. Intelligent data storing apparatus according to claim 1 for use in a paint application process, wherein the process variants relate to different applied colours and different applied patterns of paint.

10. Intelligent data storing apparatus according to claim 9, for use in a paint application process implemented in the automotive industry.

11. A system comprising the intelligent data storing apparatus of claim 1 in combination with said at least one PLC.

12. A system according to claim 1 further comprising a dedicated keypad for enabling an operator to interact with the intelligent data storing apparatus.

* * * * *